(12) United States Patent  
Wieczorek et al.

(10) Patent No.: US 8,870,259 B2  
(45) Date of Patent: Oct. 28, 2014

(54) HYBRID VISOR

(75) Inventors: Joseph P. Wieczorek, Lake Orion, MI (US); Leslie R. Hinds, Oxford, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 812 days.

(21) Appl. No.: 12/291,656

(22) Filed: Nov. 12, 2008

(65) Prior Publication Data

US 2010/0117395 A1   May 13, 2010

(51) Int. Cl.
  *B60J 3/00* (2006.01)
  *B60J 3/02* (2006.01)

(52) U.S. Cl.
  CPC .............. *B60J 3/0208* (2013.01); *B60J 3/0278* (2013.01)
  USPC ........................ 296/97.12; 296/97.8; 296/97.1

(58) Field of Classification Search
  CPC .............................. B60J 3/0208; B60J 3/0278
  USPC ........ 296/97.8, 97.6, 97.7, 97.11, 97.12, 97.1
  See application file for complete search history.

(56) References Cited

U.S. PATENT DOCUMENTS

| | | | |
|---|---|---|---|
| D58,696 S * | 8/1921 | Banks | D12/191 |
| 2,261,881 A * | 11/1941 | Horstmann | 296/97.6 |
| 4,610,477 A | 9/1986 | Ebert et al. | |
| 5,308,137 A | 5/1994 | Viertel et al. | |
| 5,449,215 A | 9/1995 | Viertel et al. | |
| 5,786,394 A | 7/1998 | Slaven | |
| 6,024,399 A | 2/2000 | Viertel et al. | |
| 6,033,005 A | 3/2000 | Crotty, III | |
| 6,474,717 B2 | 11/2002 | Viertel et al. | |
| 6,557,920 B1 * | 5/2003 | Hobson et al. | 296/97.1 |
| 6,957,841 B1 | 10/2005 | Tiesler et al. | |
| 7,066,522 B2 | 6/2006 | Torii | |
| 7,108,313 B2 | 9/2006 | Forrester et al. | |
| 7,171,112 B2 | 1/2007 | Selvini et al. | |
| 7,380,858 B2 | 6/2008 | Araga et al. | |
| 7,384,095 B2 | 6/2008 | Cormier et al. | |
| 2003/0037414 A1 | 2/2003 | Epp et al. | |
| 2003/0090123 A1 * | 5/2003 | Sturt | 296/97.8 |
| 2003/0160473 A1 * | 8/2003 | Tiesler | 296/97.1 |
| 2005/0230997 A1 | 10/2005 | Tiesler et al. | |
| 2006/0204740 A1 | 9/2006 | Rodewyk et al. | |

FOREIGN PATENT DOCUMENTS

CN   200420107987.9   11/2004

* cited by examiner

*Primary Examiner* — Glenn Dayoan  
*Assistant Examiner* — Melissa A Black  
(74) *Attorney, Agent, or Firm* — Raggio & Dinnin, P.C.

(57) ABSTRACT

A hybrid visor for use in a vehicle is disclosed. The visor includes an expanded polypropylene body and a partial clamshell engaging the body along a single longitudinal length of the body and along a single transverse length of the body. The visor also comprises a pivot rod arranged within the clamshell and a cover material arranged over the body and the clamshell. The hybrid visor provides a light weight, low cost recyclable visor that is capable of being designed into any number of configurations all while providing the same robustness and stiffness of heavier and more costly visors.

55 Claims, 9 Drawing Sheets

HYBRID VISOR

BACKGROUND OF THE INVENTION

1. Field of the Invention

The present invention generally relates to a sun visor for use in an interior of a vehicle, and more particularly relates to a hybrid visor which includes a hybrid clamshell and a body made of a foam material, such as EPP.

2. Description of Related Art

Sun visors are well known and widely used in the prior art. Many different types of visors have been successfully employed in vehicles over the years. Many of these prior art visors have been developed in a variety of ways through which visor bodies and other interior components may be constructed and mounted within the vehicle. Advances in design can often add complexities to the manufacturing processes for interior components. There has been and continues to be a premium in the automotive industry on cost savings, and improvements in the efficiency and speed in the manufacturing processes for such components therein. One area of particular focus in the automobile technology field has been reducing the number and complexity of steps required to assemble interior components, such as visors for use in vehicles. Furthermore, governmental regulations also require less dense or softer interior components to reduce the risk of head injury in vehicle crashes throughout the interior of an automotive vehicle.

Generally, in the prior art, manufacturing complexity continues to drive innovations in the automotive industry, loss of quality and performance in the manufacturing of components for the sake of facilitating production is seldom if ever acceptable. Furthermore, creating simpler versions of existing components within the automotive interior also drives the market. There is a substantial body of art relating to the specific structure of the visor to provide a strong, lightweight construction that matches or compliments the interior trim in a cost effective manner. Of particular interest has been the clamshell type construction, which involves the molding of two shell pieces or clamshell halves, which are joined to form a visor body. In one typical clamshell design, the visor halves are formed as a single piece attached along the longitudinal edge and then folded to form the visor body. The exterior surface can be molded to provide a suitable visor surface or a desired covering can be added in a variety of different ways known in the prior art.

The clamshell design allows the visor body to be constructed relatively quickly and easily, however the various components that are attached to the visor clamshell must in some cases be incorporated with several assembly steps prior to securing the clamshell halves together. For example, some of the known designs require insertion of additional mounting or journaling pieces for retention of the visor pivot rod within the visor body. The construction of the visors having such design is relatively time intensive. Moreover, the various slides, journals, retainers, etc., utilized in the construction may add significant expense and more importantly weight to the overall visor and increase the number of components necessary to build one therein and also may increase the density or hardness of the visor and not meet the governmental regulations regarding head impact standards.

Eliminating parts can reduce the expense of manufacturing and constructing a visor. The decrease in size and weight however can be accompanied by a decrease in strength. The rotatable visors are a concern where flimsy construction of the visor core and slider components may be insufficient to withstand repeated torque actions on the visor shell itself, and in some cases cause dislodging or breaking of the pieces. It is thus desirable in the art to provide a visor that is light weight, easy to manufacturing, using relatively few components and meets all federal regulations requiring head impact standards, yet utilizes a design that is simple and can be easily changed for a variety of interiors of over a wide variety of vehicle lines. Furthermore, it is desirable in the art to develop a visor that provides significant durability to withstand heavy and repeated use and to provide a solid and firm construction with tight tolerances throughout the entire system. Also, it is desirable in the art to provide a visor that is easy to recycle thus creating a visor that is more green and a simpler version of many of the visors now used in the prior art.

SUMMARY OF THE INVENTION

One object of the present invention may be to provide a hybrid visor.

Another object of the present invention may be to provide a more robust visor for use in a vehicle.

Still another object of the present invention may be to provide a hybrid visor that is capable of having a variety of designs based on a simple version and the ability to add features thereon at a reasonable cost in a relatively easy manner.

Yet a further object of the present invention may be to provide a hybrid visor that is capable of being easily recycled thus creating a more green and environmental friendly interior component for automotive manufacturers.

Still another object of the present invention may be to provide a visor that is lighter in weight and provides the necessary protection to users of the vehicle as required by governmental standards regarding head impact requirements for interior components in vehicles.

Still a further object of the present invention may be to provide a hybrid visor that is slidable and rotatable.

Still a further object of the present invention may be to provide a hybrid visor that is capable of having components added on, such as a vanity mirror assembly, electronic transmitters, and the lights associated therewith.

Still another object of the present invention may be to provide a visor that is durable and has the requisite stiffness even though it is made from an EPP body and a hybrid clamshell.

Still another object of the present invention may be to provide a hybrid visor with an EPP body that does not have any inserts molded therein or inserted therein after initial molding of the EPP visor body.

Yet another object of the present invention may be to provide a hybrid visor that is easier to manufacture and assemble than visors in the prior art thus reducing overall costs and time needed to manufacture the hybrid visor.

Still another object of the present invention may be to provide a hybrid visor that is capable of using a sock like material to create an easier to assemble visor including placing the cloth over the hybrid visor and tucking the cloth in the end of the hybrid clamshell.

According to the present invention, the foregoing and other objects and advantages are obtained by a novel design for a hybrid visor for use in a vehicle. The hybrid visor comprises an expanded polypropylene body and a partial clamshell engaging the body along a single longitudinal length of the body and along a single transverse length of the body. The visor also comprises a pivot rod arranged within the clamshell and a cover material arranged over the body and clamshell.

One advantage of the present invention may be that it provides for a hybrid visor.

A further advantage of the present invention may be that it provides for a hybrid visor for use in an interior compartment of an automotive vehicle.

Still a further advantage of the present invention may be that it provides a hybrid visor that includes a hybrid clamshell and a body formed from an expanded polypropylene (EPP) material.

Yet a further advantage of the present invention may be that it provides a hybrid visor that has a simple basic design and is capable of having other parts added thereto to reduce costs and manufacturing time to create the visor with and without various options.

Still another advantage of the present invention may be that it provides a hybrid visor that is lower in costs and lighter in weight than the visors of the prior art.

Yet another advantage of the present invention may be that it provides a hybrid visor that is easy to recycle and creates an interior component for an automotive manufacturer that is green thus reducing environmental impact and appealing to environmentally conscience consumers.

Still another advantage of the present invention may be that it provides a hybrid visor that is as stiff and robust as visors made out of all plastic materials.

Still another advantage of the present invention may be that it provides a hybrid visor that meets or exceeds all governmental regulations regarding head impact standards.

Yet another advantage of the present invention may be that it provides a way of molding a visor body into any shape to fit across numerous vehicle lines without increasing weight and assembly time.

Yet another advantage of the present invention may be that it provides a visor that is capable of adding a vanity mirror assembly, a flexible ear, or other components thereto without major design changes.

Yet another advantage of the present invention may be that it provides for a methodology of assembling a visor using a cover material that is in the form of a sock and is tucked and folded into one edge of a hybrid clamshell. This will reduce the cost and time for manufacturing of the hybrid visor.

Still another advantage of the present invention may be that it provides a visor that is capable of having any known shape and density, via the EPP molding process, thus allowing for different softnesses and hardnesses throughout the visor body.

Other objects, features, and advantages of the present invention will become apparent from the subsequent description and appended claims, taken in conjunction with the accompanying drawings.

BRIEF DESCRIPTION OF THE PREFERRED EMBODIMENT(S)

Figure 1:
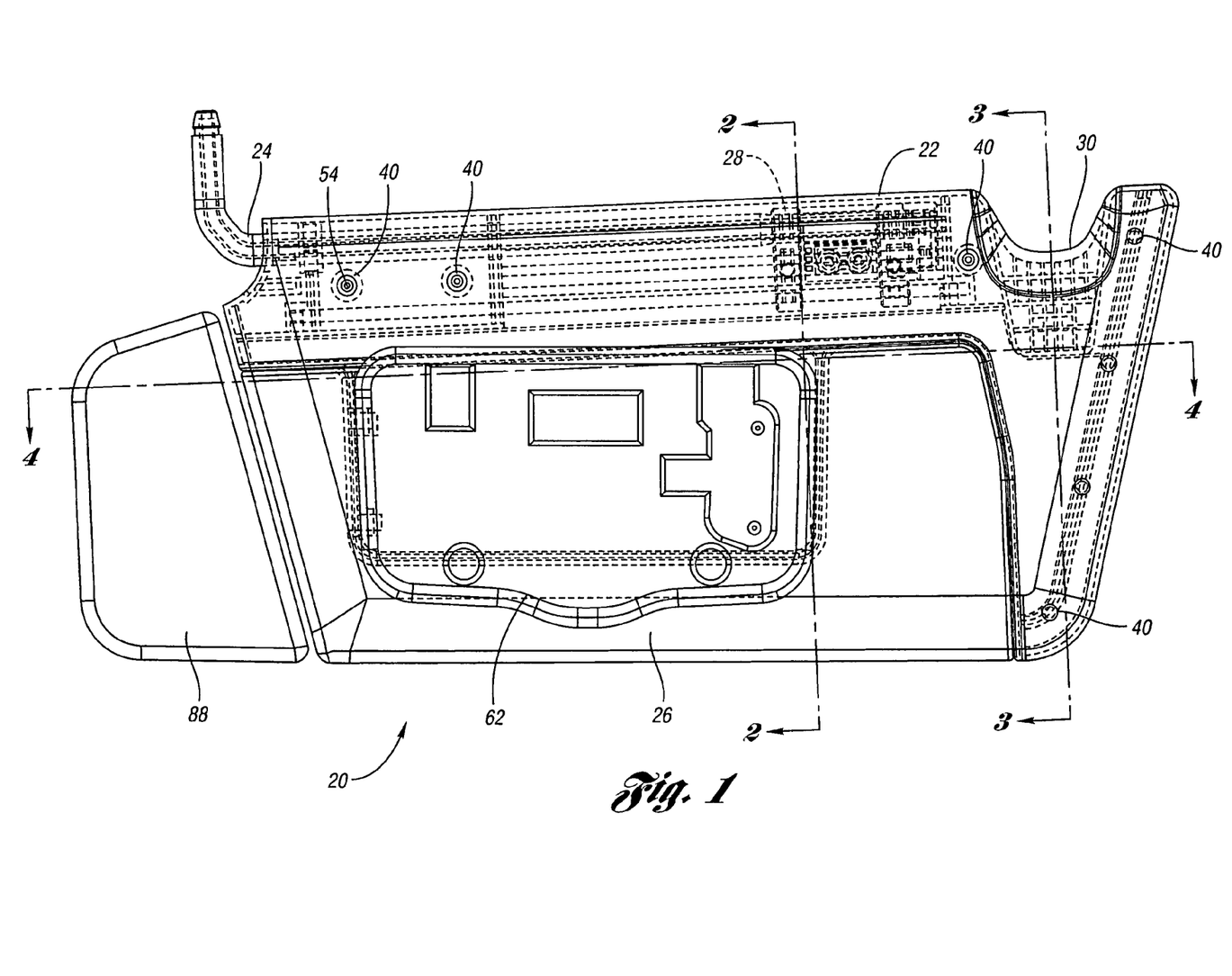
FIG. 1 shows a hybrid visor in shadow according to the present invention.
Figure 2:
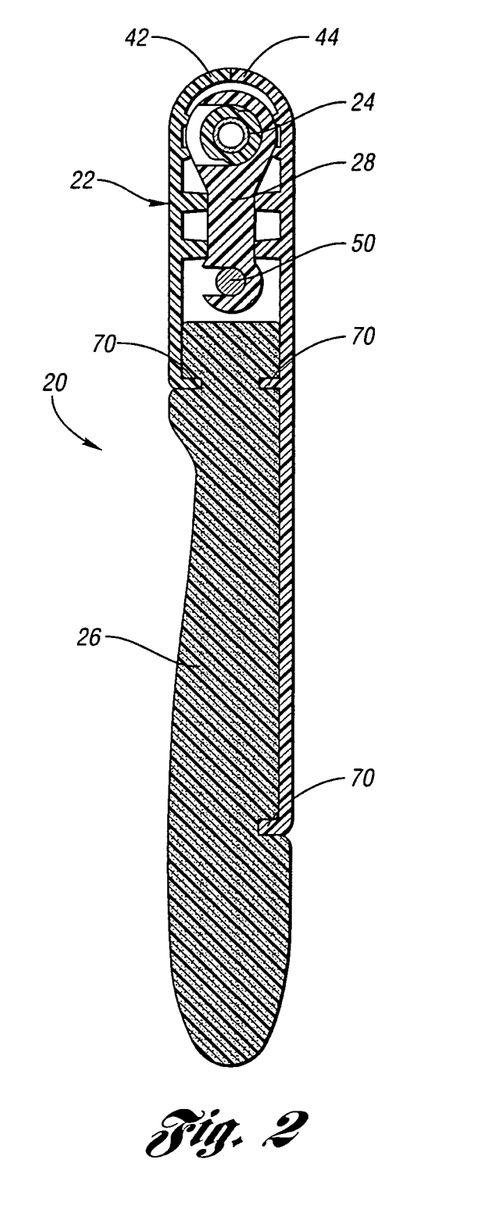
FIG. 2 shows a cross sectional view of a hybrid visor according to the present invention taken along line 2-2 of FIG. 1.
Figure 3:
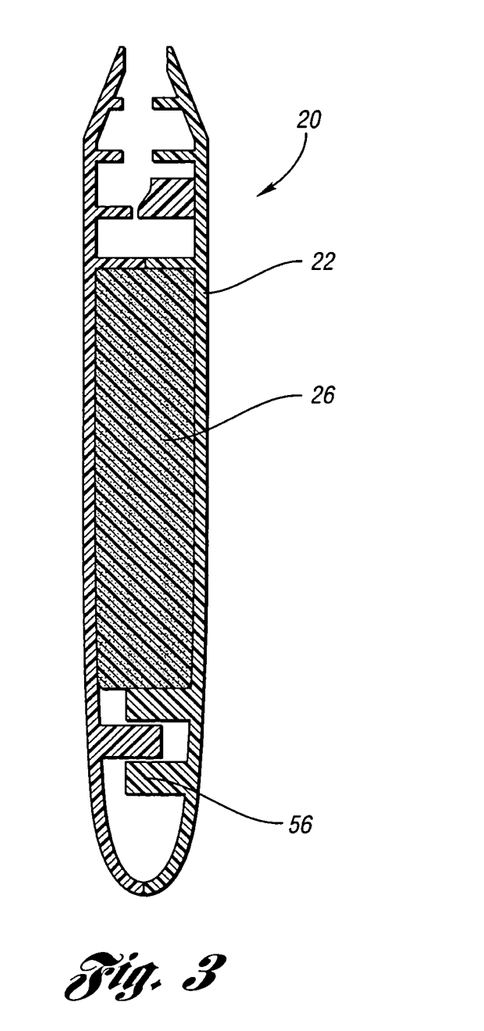
FIG. 3 shows a cross section of the hybrid visor according to the present invention taken along line 3-3 of FIG. 1.
Figure 4:
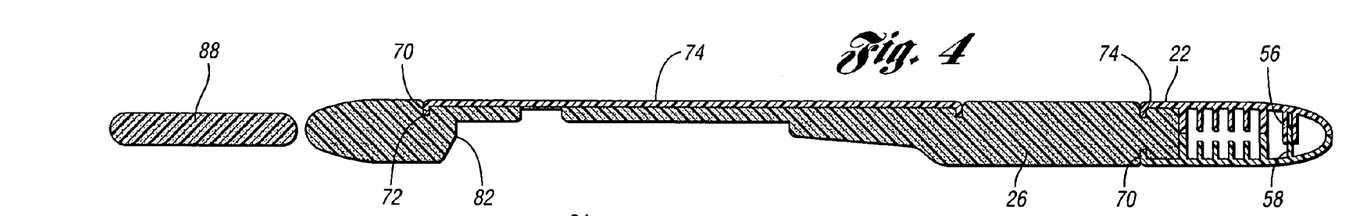
FIG. 4 shows a cross section of the hybrid visor according to the present invention taken along line 4-4 of FIG. 1.
Figure 5:
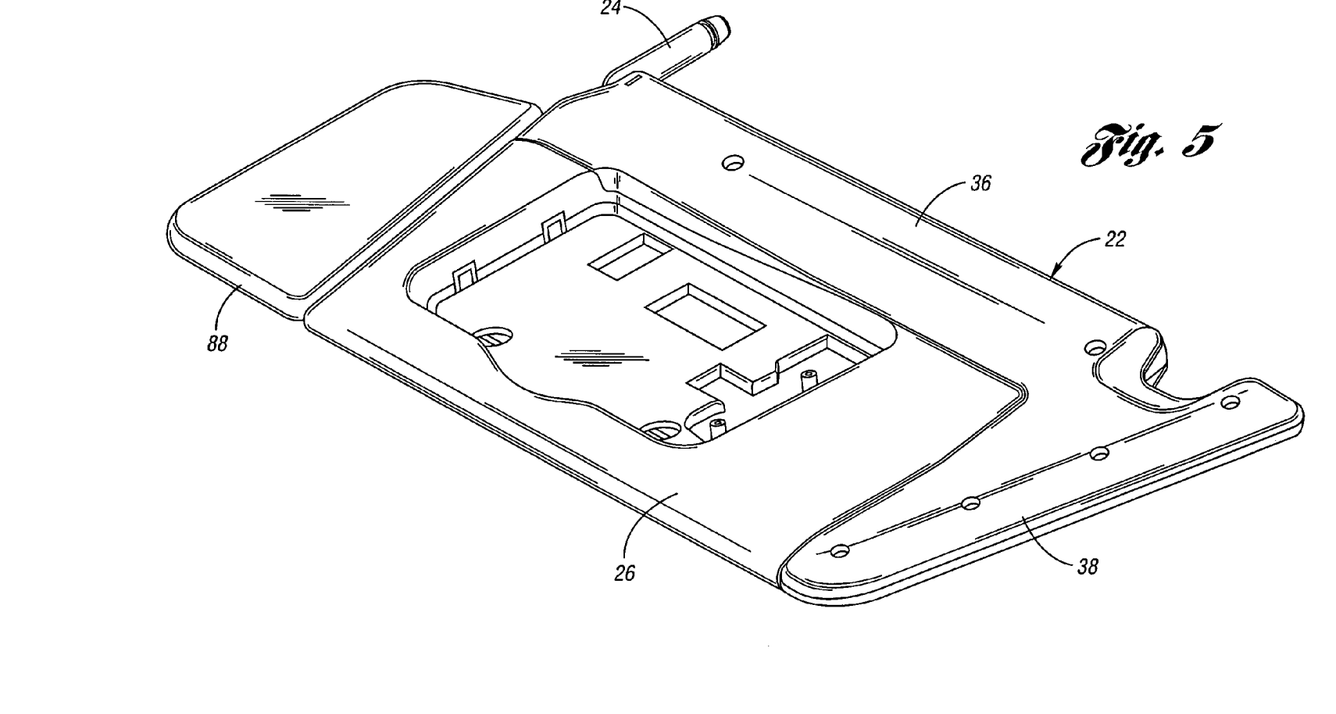
FIG. 5 shows a plan view of a hybrid visor according to the present invention.
Figure 6:
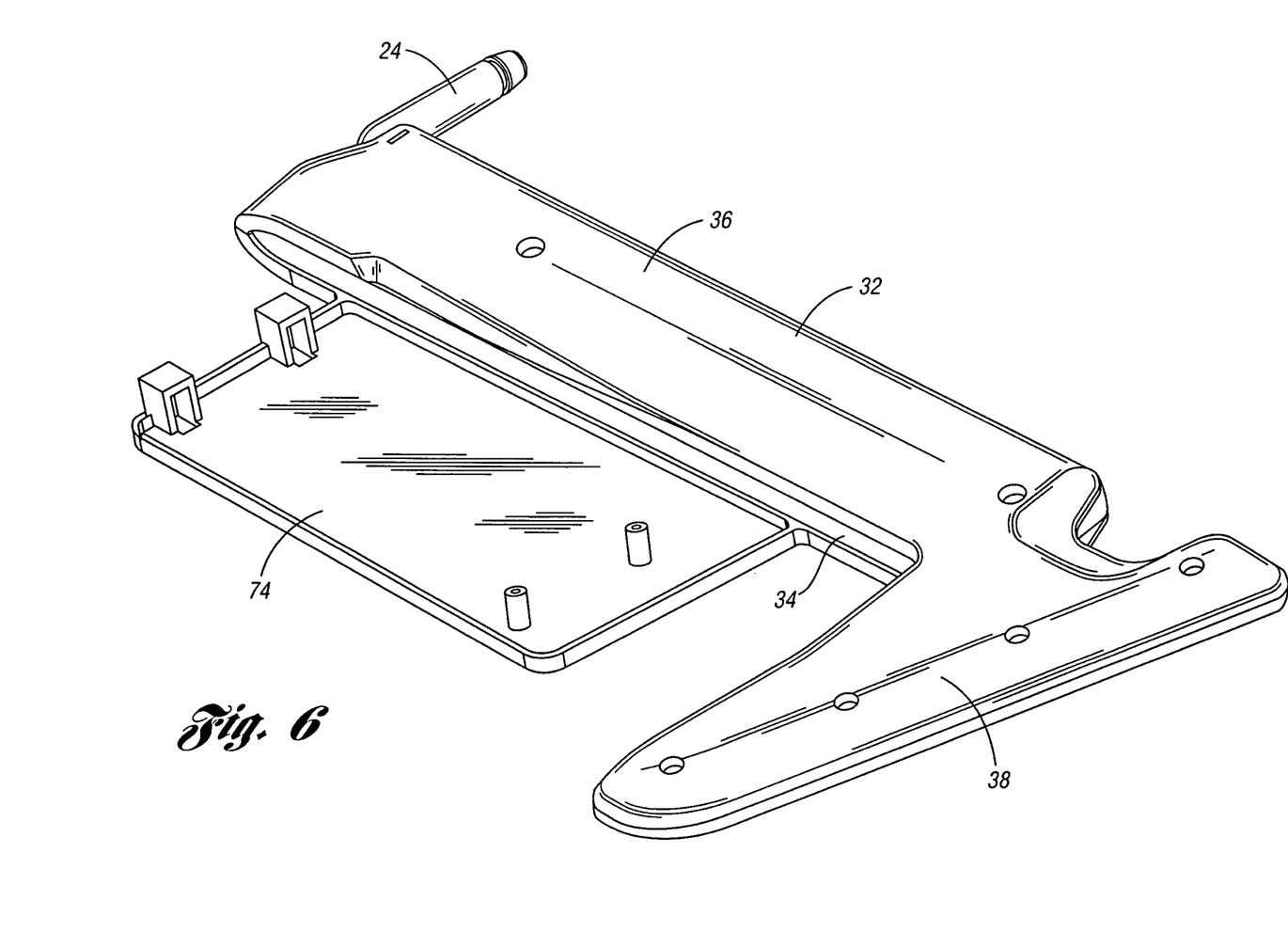
FIG. 6 shows a plan view of a hybrid clamshell according to the present invention.
Figure 7:
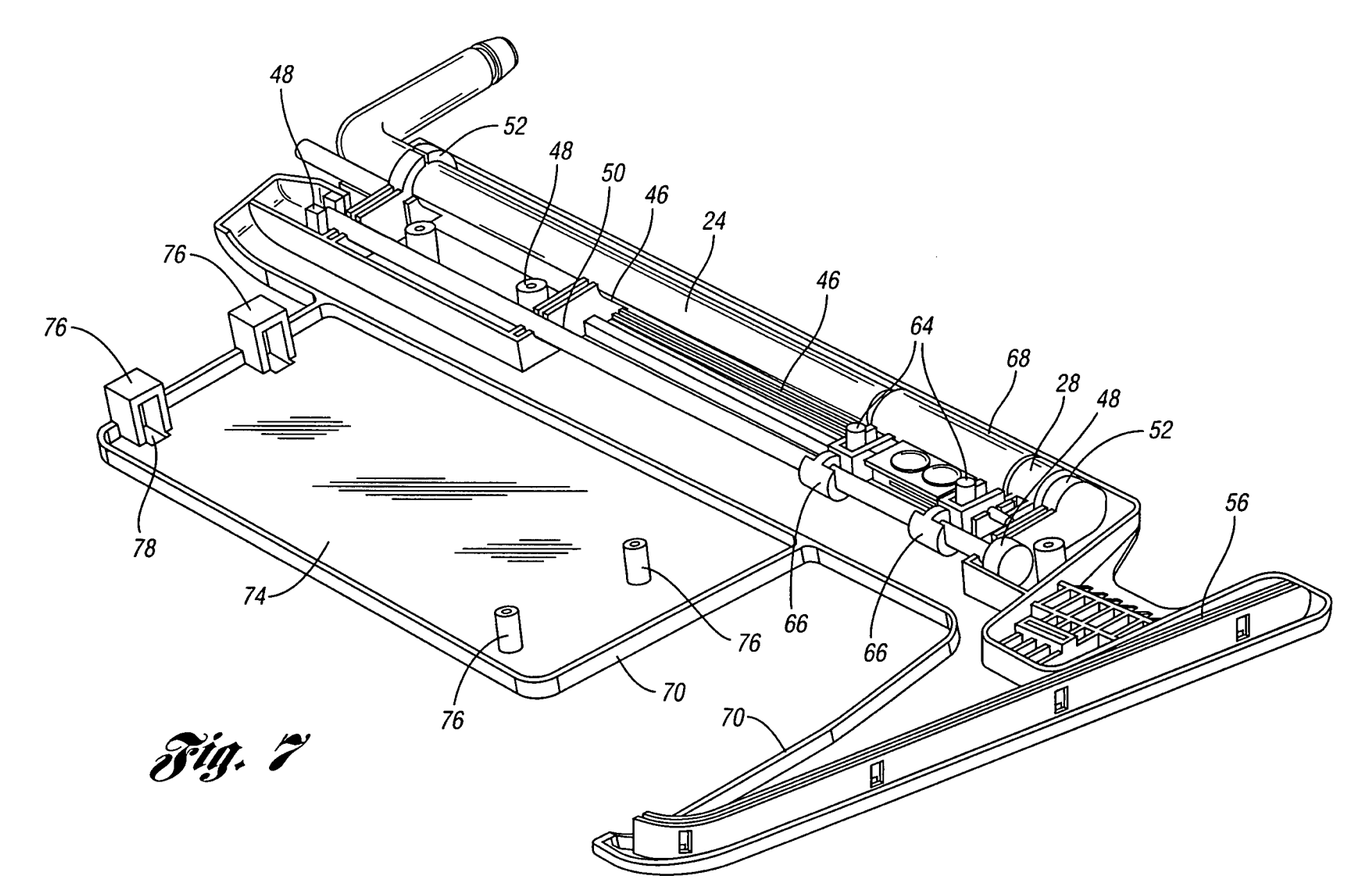
FIG. 7 shows a partial view of a hybrid clamshell according to the present invention.
Figure 8:
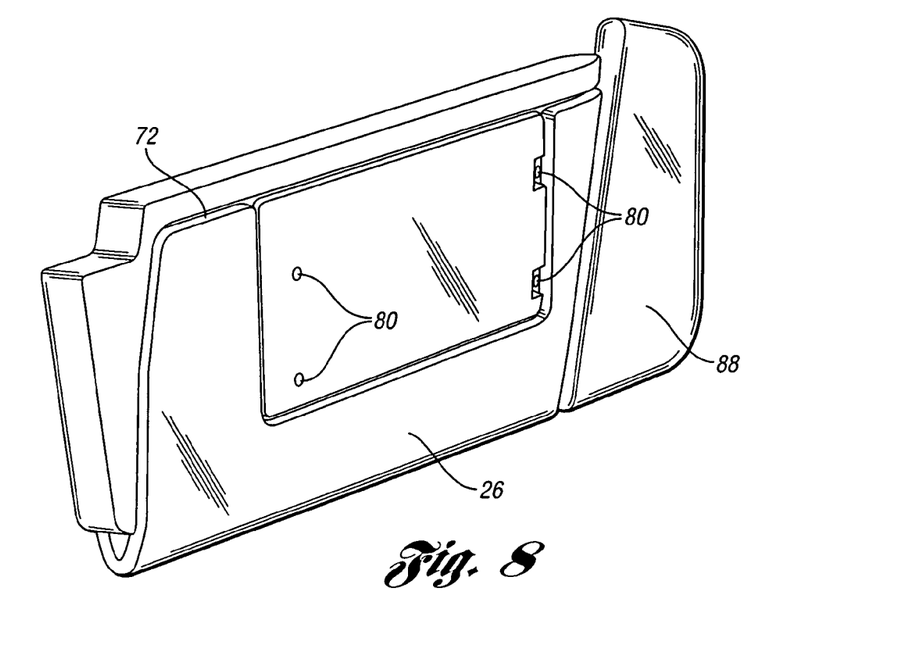
FIG. 8 shows a plan view of a visor body according to the present invention.
Figure 9:
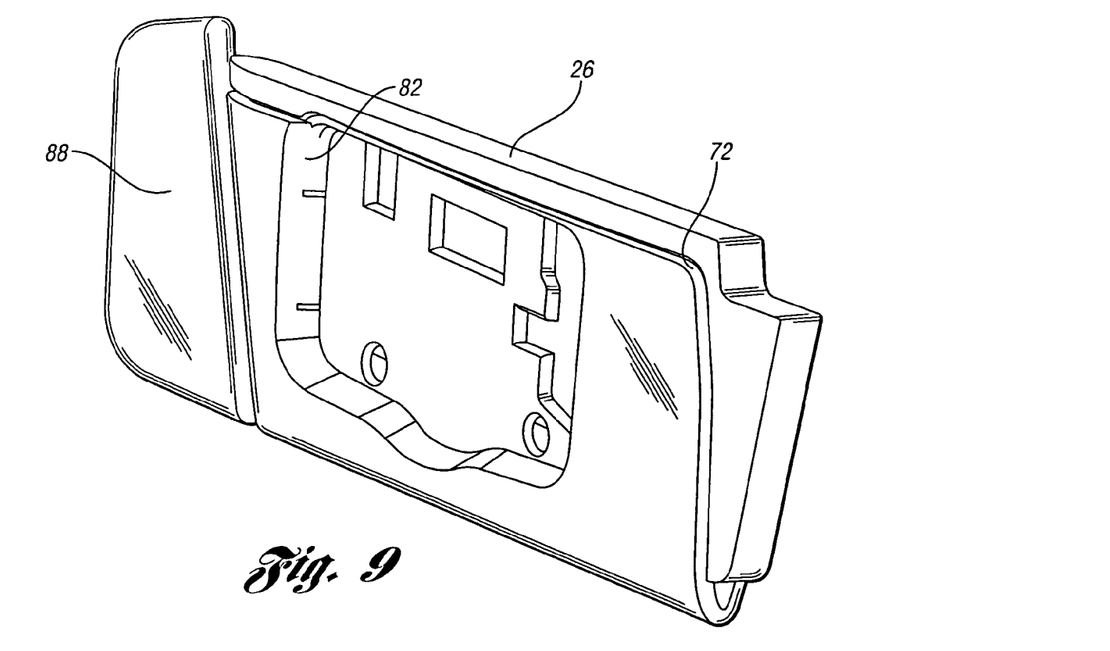
FIG. 9 shows a plan view of a visor body according to the present invention.

Referring to the drawings, there is shown a hybrid visor 20 according to an embodiment of the present invention. Generally, the present invention broadly provides a hybrid visor 20 having a hybrid clamshell 22 with a pivot rod 24 mounted within the clamshell 22 and a foam like body 26 arranged within the clamshell 22 and is captured during assembly with a single step of attaching the hybrid visor shell portions together. The visor 20 as shown in FIG. 1 also includes an optional slider 28 attached to the pivot rod 24 and is retained between surfaces and/or features, such as channels molded integrally within the hybrid visor shell portions. Further related aspects of the present invention include methods for manufacturing the sun visor also described herein. Furthermore, it should be noted that the visor 20 as shown in the present application, can be used in any known type of vehicle, such as but not limited to, automotive vehicles, maritime vehicles, aerospace vehicles, military vehicles or any other known vehicle that has a need for blocking the sun from filtering into an interior compartment of the vehicle. The hybrid visor 20 as shown in FIG. 1 generally includes a hard plastic type hybrid clamshell 22 that holds and secures a foam like visor body 26 therein. The visor pivot rod 24 is arranged within the hybrid clamshell 22, wherein the hybrid clamshell 22 also may include a D-ring or center clip 30 along with a slider mechanism 28 if so required in the visor 20. It should be noted that the hybrid visor 20 according to the present invention may be a simple basic version of a visor 20 that can be used in automotive vehicles, but also is capable of having add-ons or options, such as sliding features, clip features, vanity mirror assemblies, flexible ears, electronics, transmitters, lights, and any other known and unknown features easily configured and attached to the hybrid clamshell 22 or the visor body 26 according to the present invention. It should further be noted that the hybrid visor 20 according to the present invention is recyclable which allows manufacturers to tout that the visor is green and capable of being stripped down into its basic components and have most of the parts recycled for reuse in other plastic products or metal products depending on the materials being recycled from the visor 20. The hybrid visor 20 according to the present invention also is capable of having its visor body 26 molded into any known shape, not just those generally known in visors of the prior art, such as the shape shown in FIG. 1 of the present application, but into any known shape with any known curves throughout its surfaces and in any random shapes or known shapes to create visors that help block sun from infiltrating the interior compartment of the vehicle. Furthermore, the hybrid visor 20 of the present invention meets or exceeds all governmental regulations regarding head impact standards through the use of a foam like material for the visor body 26, wherein the density of the foam like material can be adjusted to create a softer or stiffer visor body 26 for the visor 20 across a variety of vehicle lines and in a variety of vehicle environments.

In the embodiment shown in FIGS. 1 through 13, the hybrid visor 20 includes a first 32 and second 34 hybrid shell, engageable to form the hybrid clamshell 22 having a generally L-shape. The hybrid clamshell 22 generally is made of a hard plastic or thermoplastic material and in one embodiment is made from an ABS material that is easily moldable into various configurations. It should be noted that any other known machinable or moldable material may be used for the hybrid clamshell 22 other than hard plastic, such as but not limited to ceramics, composites, any type of plastic, foams, metals, natural materials, or the like. In the embodiment shown the hybrid clamshell 22 generally has an overall L-shape when viewed from a side. It should be noted that the hybrid clamshell 22 may have any known shape. The L-shape includes one long longitudinal length 36 and a shorter transverse length portion 38. The clamshell 22 may have various molded features included on each shell 32, 34 to facilitate engagement of the shells 32, 34. For example, complimentary structures 40 may be formed on the respective hybrid shells that allow a snap fit therebetween or that allow for fasteners to be used to securely fasten the hybrid shells 32, 34 to one another. In one contemplated embodiment, the shells 32, 34 may be formed having integral or connected longitudinal peripheral edges 42, 44 respectively. Other embodiments are contemplated in which the shells 32, 34 are formed as separate unconnected members. All of the connected shells 32, 34, as shown in the Figures, generally are preferred for the hybrid visor 20, although most of the Figures are shown as having separate unconnected shells for clarity and ease of description.

The hybrid clamshell 22 may include a pivot rod assembly that comprises a pivot rod 24 and a pivot rod slider 28 arranged on an end thereon. It should be noted that in the embodiment shown a slider 28 is used in conjunction with the pivot rod 24, however it is also contemplated to have embodiments where a pivot rod 24 is arranged within the hybrid shells 32, 34 on its own. The hybrid clamshell 22 may have a channel 46 in which the pivot rod 24 may be arranged and/or other channels 46 molded therein through which the slider 28 may be slidingly arranged within the longer length portion 36 of the hybrid clam shell 22. There may also be molded within the hybrid clamshell 22 a plurality of journals or other channels 48 in which a support arm 50 may be arranged therein. Arcuate retaining surfaces 52 may also be molded therein to allow for rotation of the pivot rod 24 with relation to the hybrid clamshell 22 and for retaining the support arm 50 within the hybrid clamshell 22. It should be noted that any known configuration of channels, arcuate surfaces, or other support surfaces may be molded within the longitudinal portion 36 of the hybrid clamshell 22 to allow for the pivot rod 24 and any associated slider mechanism 28 and slider assembly features to be securely arranged therein. The hybrid clamshell 22 also may include at least one connecting member 40 molded therein for receiving a fastener 54 that will secure the two hybrid shells 32, 34 to one another to form the overall hybrid clamshell 22 as described in the present invention. The first hybrid shell 32 and the second hybrid shell 34 preferably have three connecting members 40 through which fasteners are placed to allow for complete closure of the first shell 32 to the second shell 34 to form the hybrid clamshell 22 for the hybrid visor 20. It should be noted that fastener 54 may be a screw, however any other type of fastener such as a rivet, pin, dowel, or any other known mechanical or chemical fastener may also be used to secure the two hybrid shells 32, 34 to one another to form the hybrid clamshell 22. It should also be noted that in another contemplated embodiment the two hybrid shells 32, 34 may be secured to one another via any known snap fit arrangement and not with traditional fasteners as described above. Such snap fit arrangements may include a predetermined retention cavity 56 having a predetermined shape locking pin or rib 58 inserted therein to create the necessary closing forces and holding forces to secure the first hybrid shell 32 to the second hybrid shell 34 in the present invention. The outer surface of the hybrid clamshell 22 also may have a predetermined shaped surface with a generally curved surface near the outer edges thereof to form the outer visor body as shown in the figures. The hybrid shells 32, 34 also may include the necessary connecting features molded in each shell to receive a D-ring or center pin 30 to allow for the sun visor 20 to be connected and pivoted to and about a mount member on the interior of the vehicle roof.

The hybrid shells 32, 34 also may include as shown in the Figures on the shorter transverse length 38 of the L-shaped hybrid clamshell 22 a molded snap fit system to secure the transverse portion 38 of the hybrid clamshell 22 to one another after assembly of the overall hybrid visor 20. The hybrid shell snap fit system as shown in the Figures generally includes an elongate locking channel 56 that includes a plurality of orifices through the surfaces thereof, yet works in conjunction with an elongate rib that mates with the channel 56 with the rib 58 having locking members that are arranged in an complimentary manner to the orifices in the locking channel 56 of the transverse portion of the clamshell 22. The locking members interact with the orifices of the locking channel 56 thus allowing a locking surface of the locking member to engage a locking shoulder of the locking channel 56 thus ensuring that the transverse portion 58 of the hybrid clamshell 22 is secured to one another after having the outer covering or material 60 of the hybrid visor 20 is tucked therein and held therein. It should further be noted that in another contemplated embodiment the transverse portion 38 of the hybrid clamshell 22 may include a plurality of teeth that would help to hold and secure the cover material 60 to the hybrid visor 20 during the final assembly steps. These teeth generally extend in an inward direction from the outer peripheral edge of the hybrid shells 32, 34 transverse portion. The transverse portion 38 or longitudinal position 36 of the clamshell 22 may have any known shape not just those shown in the Figures. It should further be noted that the longitudinal portion 36 of the hybrid clamshell 22 may also include the necessary electrical connections to allow for electricity to pass through the pivot rod 24 to an optional vanity mirror assembly 62 or other lights in order to allow for lights to illuminate a mirror and the person looking in the vanity mirror or other objects on or near the hybrid visor 20.

In the embodiment shown the slider 28 of the hybrid visor 20 may be secured over an end of the pivot rod 24. The rod 24 is slidably supported within the channel 46 of the hybrid clamshell 22. The slider 28 may have locating projections 64 extending from both sides thereof and in one contemplated embodiment the slider projections 64 generally have a cylindrical shape, but any other known shape may also be used for the locating projections 64. In the embodiment shown two locating projections 64 extend from both sides thereof. The plurality of locating projections 64 assist in providing relative support between the visor 20 and pivot rod 24 via an interaction between the channel 46 and the supporting projections 64 sliding therein. The slider 28 may be attached to the pivot rod 24 that via journals which rotatably retain the pivot rod 24 therein. The slider 28 further may have a plurality of supporting extensions 66 which slidably engage with the support arm 50 wherein the support extension 66 is preferably an arcuate member that is positioned over the support arm 50. The slider 28 may also include an end projection at one end of the slider 28 opposite of the pivot rod 24. The projection may be received in a substantially mating stop position at the opposite end of the channel of the visor 20. Thus, the slider 28 slides back and forth relative to the hybrid clamshell 22, a stop limits the travel of the slider 28. It should further be noted that the visor 20 may also include a cover member 68 arranged over a predetermined portion of the slider 28. The slider 28 also may include a detent mechanism to allow for the visor to be placed in various positions relative to the windshield and interior roof of the automotive vehicle. The support arm 50 may be arranged within journaled surfaces or any other known holding surface molded into the hybrid shells 32, 34 thus being retained therein when the hybrid shells 32, 34 are secured to one another in its final assembly position.

The hybrid clamshell 22 may also include a retaining rib 70 generally located along the inner peripheral edge of the hybrid clamshell 22. The retention rib 70 may extend from both the first hybrid shell 32 and the second hybrid shell 34. Generally, when viewed from the side the retention rib 70 has a generally L-shape. This retention rib 70 may extend a predetermined distance from the inner surface of the hybrid shells 32, 34. The retention rib 70 may be used in conjunction with a retention channel 72 on a visor body 26 to properly align and secure the visor body 26 with respect to the hybrid clamshell 22. The retention rib 70 may have any known shape and cross section.

The hybrid clamshell 22 in the embodiment shown may also include a vanity mirror support member 74. The vanity mirror support member 74 generally extends from a bottom portion of the longitudinal length 36 of one of the hybrid shells. In the embodiment shown the vanity mirror support member 74 generally has a rectangular shape. However, the shape will mimic that of the outer portion of the visor vanity mirror assembly that is to be attached and secured to the hybrid visor 20 according to the present invention. The visor mirror support member 74 may include a plurality of locking and aligning members 76 extending therefrom wherein these members 76 hold and align the vanity mirror assembly in a predetermined position with respect to the hybrid clamshell 22 and visor body 26. These locking and aligning members 76 may be arranged anywhere on the visor mirror support member 74. Orifices 78 may also be arranged through the visor mirror support member 74 to allow for electronics and other connecting members of the vanity mirror assembly to interact therewith to create a secure connection between the visor mirror support member 74 and the vanity mirror assembly. The vanity mirror support member 74 generally may have a retention rib 70 arranged around the outer periphery thereof and extending in the same direction as the retention rib 70 extending around the inner periphery of the hybrid clamshell 22. Generally, in cross section the retention rib 70 may have a generally rectangular or square shape, however any other known shape may also be used for the retention rib 70 of the hybrid clamshell 22.

The hybrid clamshell 22 is generally molded from a hard plastic or thermoplastic material and in one preferred embodiment an ABS material is used. However, any other plastic material or composite material capable of being molded into predetermined shapes, such as that needed for the hybrid clamshell 22 may also be used according to the present invention. It should also be noted that other forming techniques may also be used to create the hybrid clamshell 22 such as but not limited to heat forming, machining, powder systems, etc. Hence, the hybrid shells 32, 34 of the present invention generally may have a plurality of complimentary structures that will secure the first and second shell 32, 34 to one another wherein the structures may include features that use fasteners or snap fit systems to create the securement between the first and second hybrid shell 32, 34. It should also be noted that the pivot rod 24 is capable of rotating with respect to the clamshell 22 and slide in a longitudinal direction with respect to the longitudinal length 36 of the clamshell 22.

The drawings also show a hybrid visor 20 having a visor body 26 made of a foam like material. In one contemplated embodiment the foam like material is an expanded polypropylene (EPP) material. The EPP visor body 26 is capable of being molded into any known shape with any known curve arranged therein. The EPP visor body 26 also is capable of being molded with any known density to allow for the hardness or softness of the EPP visor body 26 to be adjusted depending on the environment in which the hybrid visor 20 will be used. The EPP body 26 generally will be formed and molded into a generally rectangular shape. However, extensions, cutouts and other shapes may be molded into the EPP body 26 and those shown in the Figures are Just one contemplated embodiment any other known shape may be used for the EPP body 26 depending on the environment in which the hybrid visor 20 will be used. The EPP body 26 generally may be molded using EPP beads and the necessary molding equipment to form the visor body 26 into the desired shape, such as but not limited to those shown in the Figures. The EPP visor body 26 generally may include a retention channel 72 arranged along a longitudinal portion thereof and a transverse portion thereof which generally is complimentary to and mirrors the retention rib 70 of the hybrid clamshell 22. The retention channel 72 may have a predetermined depth but generally is the same as the height of the retention rib 70 of the hybrid clamshell 22. The retention channel 72 of the EPP body 26 generally is molded into both sides of the body 26 such that both shells 32, 34 of the hybrid clamshell 22 will be arranged within a retention channel 72 when the hybrid shells 32, 34 are secured around the EPP visor body 26. The EPP visor body 26 also may include a plurality of orifices 80 therethrough in one embodiment contemplated for receiving a visor vanity mirror assembly or other accessories that may be attached to the visor 20. In one embodiment shown in FIG. 9 the EPP body 26 has a predetermined shaped cavity 82 arranged in one side thereof wherein that cavity 82 generally mimics the outer shape of a vanity mirror assembly which is arranged within the hybrid visor 20 according to the present invention. This cavity 82 may be arranged over a vanity mirror support member 74 that is molded into one of the shells 32, 34 of the hybrid clamshell 22. Therefore, any known cavities may be molded into the EPP body 26 depending on the type of mirror assembly arranged therein or other accessories that may be arranged therein and need to be offset within the visor body 26 to give the visor 20 a smooth surface on its outer surface such that it is pleasing and aesthetically appealing to the users of the automotive vehicle. It should be noted that the EPP visor body 26 may have any known thickness and length depending on the environment in which the hybrid visor 20 will be used. It should also be noted that EPP is the preferred material for the visor body 26, however any other foam like material, composite or natural material may also be used as long as it meets the governmental regulations regarding head impact standards. It should be noted that the retention channel 72 also may be of any known shape and any known depth and may have any known configuration and be arranged on either one or both sides of the EPP body 26 depending on the design of the hybrid clamshell 22. The securing of the clamshell 22 to the body 26 may occur by any known fastening technique not just those disclosed herein.

Figure 10:
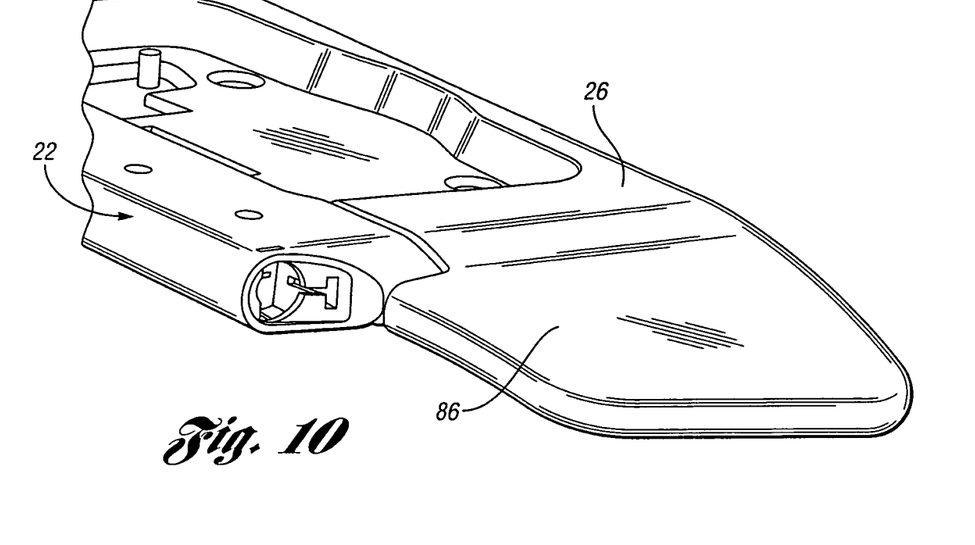
FIG. 10 shows a visor body and a hybrid clamshell according to the present invention.
Figure 11:
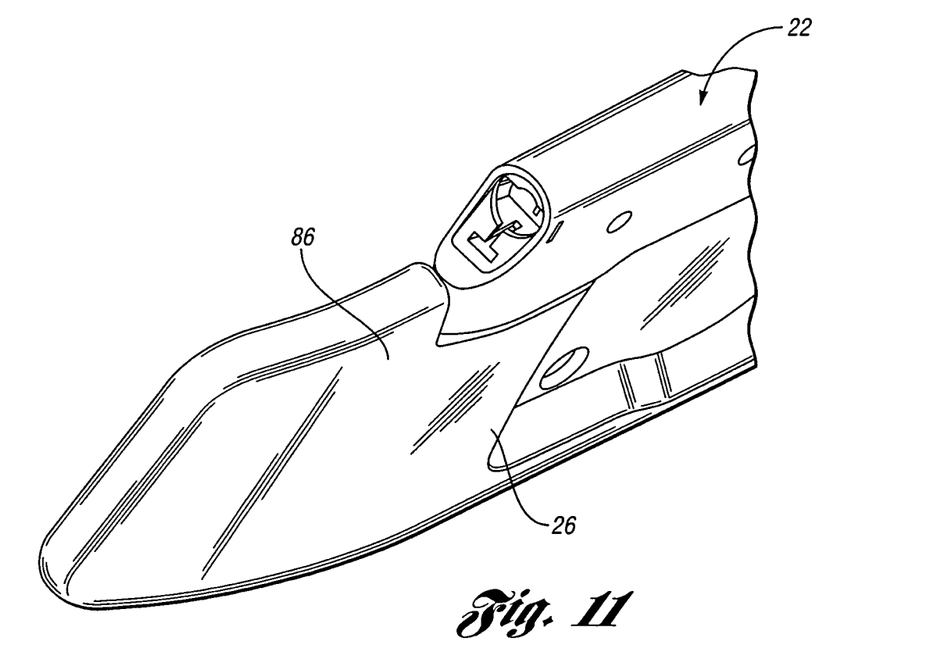
FIG. 11 shows a hybrid body and clamshell according to the present invention.
Figure 12:
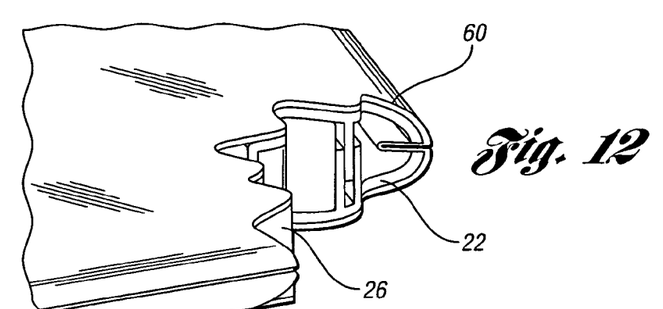
FIG. 12 shows a cutaway view of a hybrid visor according to the present invention.
Figure 13:
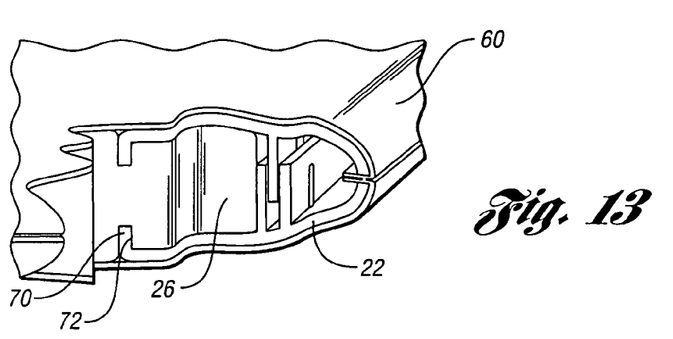
FIG. 13 shows a cutaway view of a hybrid visor according to the present invention.

In one embodiment shown in FIGS. 10 and 11 the hybrid visor body 26 has a predetermined curve on an end portion 86 thereof, wherein the curve generally will mimic the curvature in the interior of the roof of the vehicle in which the visor 20 will be placed. This will allow the visor 20 to be closely fit against the roof in the interior of the vehicle when the visor 20 is in its upper stored position. It should be noted that any degree angled curve 86 may be molded into the visor body 26 depending on the design requirements and the environment in which the visor 20 will be used in the vehicle.

Figure 14:
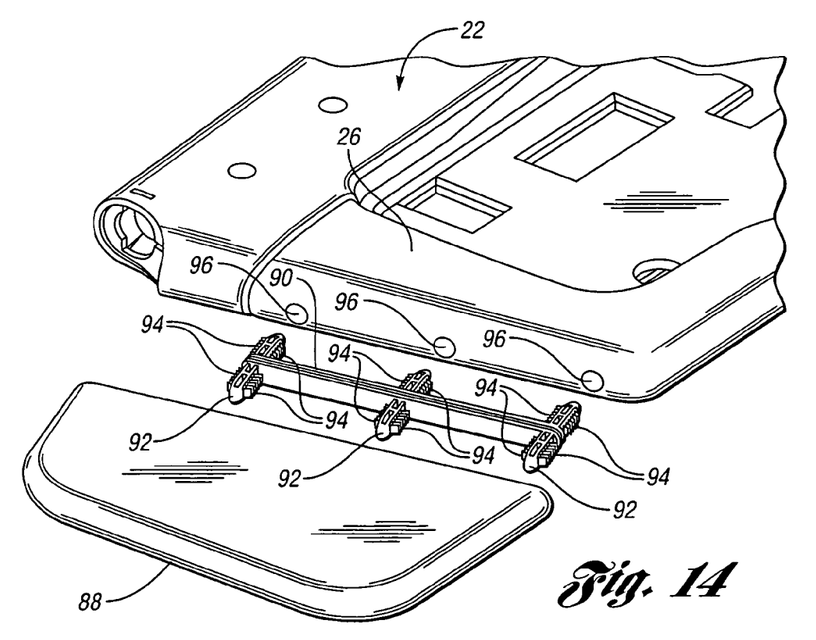
FIG. 14 shows a living hinge used on a hybrid visor in an alternate embodiment of the present invention.
Figure 15:
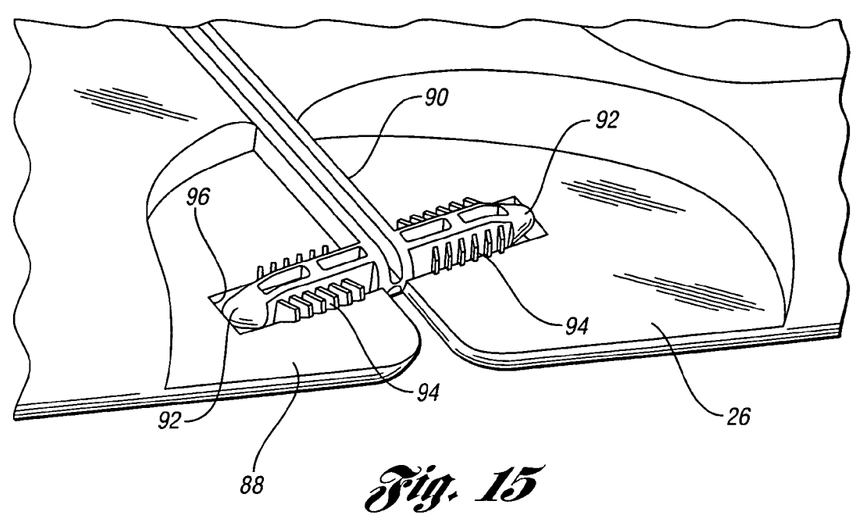
FIG. 15 shows a cutaway view of the living hinge according to the alternate embodiment of the present invention.
Figure 16:
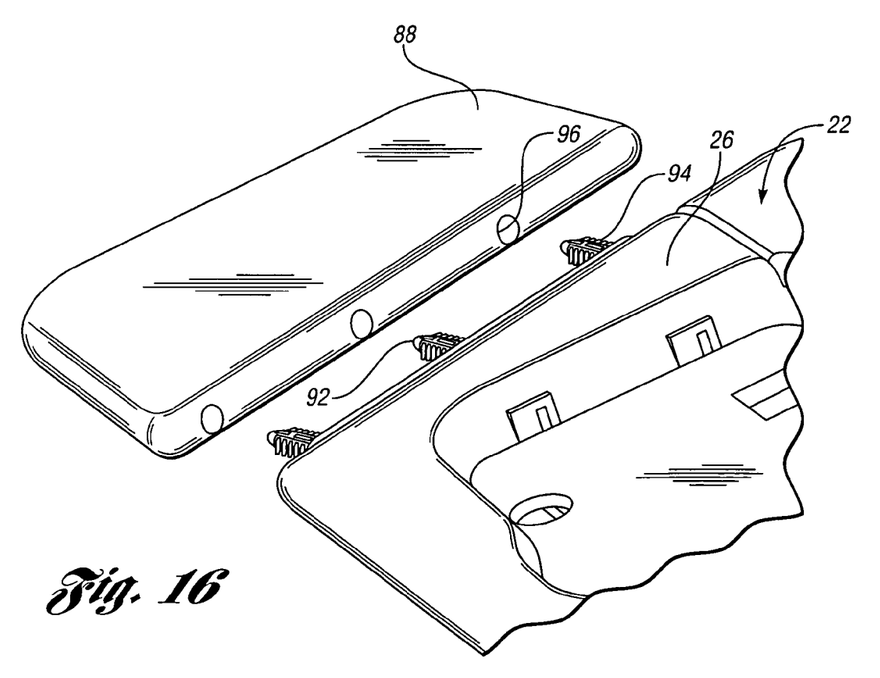
FIG. 16 shows another view of the living hinge according to the alternate embodiment of the present invention.

In another embodiment shown in FIGS. 14 through 16 a separate flexible ear 88 will be molded out of the EPP or other material and be attached to one end of the visor body 26 via a living hinge 90. Generally, the living hinge 90 is made out of a plastic material, however any other composite, metal, ceramic, or natural material may be used for the living hinge 90. The living hinge 90 generally may have a body with a generally H-shaped cross section that will allow for flexibility of the ear 88 in either direction with respect to the visor body 26. Extending from the outer surface of the body of the living hinge 90 may be at least one locking pin and generally extending from at least one surface of each locking pin 92 may be a plurality of locking fingers 94 placed at a predetermined angle with respect to the locking pin 92. These locking pins 92 are arranged in predetermined placed orifices 94 that are either machined or molded into one end of the flexible ear 88 and one end of the visor body 26 such that the pins 92 may be arranged therein and allow for the flexible ear 88 to bend with respect to the visor body 26 to allow for conforming of the visor 20 to the curvature of the roof on the interior of the vehicle. In the embodiment shown three locking pins 92 extend from each side of the body of the living hinge 90. However, it is contemplated to have just one locking pin 92 on each or a plurality of locking pins 92 extending from each side depending on the design requirements. Generally, the living hinge 90 may be arranged within the orifices 96 on the side of the visor body 26 first and then the flexible ear 88 may be arranged over the locking pins 92 extending from the opposite side of the living hinge 90 allowing for the ear 88 to be placed into a bendable relationship with the visor body 26.

During operation, the hybrid visor 20 can be used on both the passenger and driver side of the automotive vehicle. Each of the visors 20 may have the EPP body 26 and the hybrid clamshell 22 arranged therein, wherein the outer surface of both portions will create a nice smooth surface such that the user of the vehicle will not know that a hybrid visor 20 is being used. The hybrid visor 20 may also include a thin layer of padding or other material between the cover material 60 and the visor body 26 and clamshell 22. The use of the hybrid visor 20 may greatly reduce the weight of the visor while keeping the rigidity and stiffness of the visor 20 that the user of the vehicle has become accustomed to. The hybrid visor 20 with the generally hard plastic hybrid clamshell 22 ensures that the EPP visor body 26 will not bend or flex where it is not designed to. The hybrid visor 20 design generally has a simple basic version and is easily optioned into a sliding visor having a vanity mirror therein depending on the parts molded into the hybrid clamshell 22 and visor body 26. The addition of all of these parts generally only increases the weight a nominal amount and does not affect the durability and stiffness of the hybrid visor 20. Furthermore, the hybrid visor 20 has a visor body 26 that does not need reinforcements, such as metals, or plastic frames therein to create the durability and stiffness as that of the more expensive visors to make as seen in the prior art. Therefore, the hybrid visor 20 can be used for any known visor because the design of the visor body 26 can be changed by a simple molding procedure. Furthermore, the hybrid visor 20 also is easy to recycle at the end life of the automotive vehicle, thus creating a greener interior component for the manufacturers to tout in the ever increasing green vehicle market. To manufacture the hybrid visor 20 of the present invention a manufacturer would mold the hybrid clamshell 22 either as one piece with a hinge along the top peripheral edge thereof or as two separate pieces depending on the manufacturer's environment and needs. The first and second hybrid shell 32, 34 would be molded with the necessary channels and connecting members therein to allow for insertion of any options that may be required in the hybrid visor 20 such as but not limited to a sliding visor, clips, rotational mechanisms, electronics, transmitters, a vanity mirror assembly, and/or a D-ring or center clip. Generally, the preferred material for molding of the clamshell 22 is an ABS or thermoplastic material. The hybrid shell 32, 34 would also have the retention rib 90 molded therein to allow for interaction and securing of the visor body 26 between the hybrid shells 32, 34. The manufacturer also would mold the visor body 26 out of an expanded polypropylene material. It should be noted that any other foam like material may also be used. The mold of the visor body 26 may include any necessary cavities, curves or the like therein to allow for the visor body 26 to fit in the interior of the vehicle in which the hybrid visor 20 will be used. The visor body 26 may include any necessary cavities for any accessories, such as vanity mirror assemblies, lights, clips, transmitters or any other known accessories for use on the hybrid visor 20. After the molding of the EPP body 26 the assembler will position a pivot rod 24 between the molded surfaces of the hybrid shells 32, 34 along with, if it is required as an option, a slider 28 and a support arm 30. Next, the visor body 26 will be positioned along the inner periphery of the hybrid clamshell 22 such that the retention channel 72 along the visor body 26 will have arranged therein the retention rib 70 generally along the inner periphery of the visor clamshell 22. Next the first shell 32 will be secured to the second shell 34 thereby aligning and holding the visor body 26 between the shells 32, 34 along a generally L-shaped path defined by the visor body retention channel 72 and hybrid clamshell retention rib 70. Securing the first shell 32 and second shell 34 in one embodiment contemplated will occur via fasteners opened along the longitudinal portion 36 thereof and via a snap fit system along the transverse portion 38 of the hybrid clamshell 22. Generally, the fasteners will be arranged therein first and then a cover material 60 will be positioned over and secured over the hybrid clamshell 22 and visor body 26 in any known connecting methodology. It should be noted that any type of material 60 may cover the outer portion of the hybrid visor 20 and any methodology may be used for the attachment and securing of that covering material 60 over the outside of the visor 20.

In one contemplated embodiment the cover material 60 will generally be in the form of a sock with an orifice on one end thereof. The orifice will be arranged over the visor body 26, the end of the pivot rod, and the hybrid clamshell 22 and then either folded or tucked within the open end of the transverse outer edge of the hybrid clamshell 22. Then the transverse portion 38 of the hybrid clamshell 22 will be secured into secure engagement with one another thus pinching and holding the sock like cover material 60 in a tight relationship to the outer surfaces of the hybrid clamshell 22 and EPP visor body 26. Next, any exterior accessories will be connected to the visor 20, such as a D-ring 30 or vanity mirror assembly 62. These will be snap fit or engaged in any other known method into engagement with a molded portion of the hybrid clamshell 22. It should be noted another contemplated embodiment will involve a plurality of teeth extending from an inner peripheral edge of the transverse portion of the hybrid clamshell 22 which will further hold and secure the open end of the sock like cover material 60 between the two visor clamshell portions 32, 34. Another contemplated embodiment will have the open end of the sock 60, after the sock 60 is arranged over the visor body 26 and hybrid clamshell 22 closed with a stitch line arranged along the open end and then such stitched end tucked into the gap between the edges of the transverse outer edge of the first and second shell 32, 34 and the first and second shells 32, 34 secured to each other via a snap fit system as described above. Any other technique for tucking and folding the cover material/sock 60 into the transverse outer edge of the hybrid clamshell 22 may also be used to ensure the cover is tight and gives an aesthetically pleasing outer cover surface to the hybrid visor 20.

Therefore, the hybrid visor 20 as described in the present invention provides a simple version of a visor 20 that is capable of being used with any number of options or as a basic visor with no accessories. This visor 20 is easy to manufacturer, is lighter in weight and will reduce the overall cost to the manufacturer of the visors. It also provides a visor 20 that meets or exceeds all head impact requirements through the use of the EPP visor body 26 and the plastic hybrid clamshell 22. The visor 20 also provides for easy recyclability thus allowing a manufacturer to tout of the greenness of such visor 20 in the ever increasing green conscious consumers of modern day vehicle buyers. The visor 20 also is capable of being molded into a variety of shapes to allow for low cost alternatives to manufacturers. Furthermore, it provides a visor 20 that is just as stiff as all plastic visors or just as stiff as visors using EPP with multiple inserts of metal and plastic therein to provide the necessary stiffness and robustness that users of automotive vehicles require in their visors while also providing the necessary head impact requirements.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for use in a vehicle, said visor comprising:
an expanded polypropylene body;
a partial clamshell only securing said body along an entire single longitudinal length of said body and along an entire single transverse length of said body, said clamshell having a first and second shell, said first shell having a mirror support member extending from a bottom edge thereof, said mirror support member having a retention rib arranged at an outer periphery thereof, said mirror support member extends beyond a bottom edge of said second shell, said retention rib engages said body;
a pivot rod arranged within said clamshell; and
a cover material arranged over said body and said clamshell.

2. The visor of claim 1 further comprising a flexible ear arranged on one end of said body.

3. The visor of claim 2 wherein said ear is molded thereon when said body is molded.

4. The visor of claim 2 wherein said ear is molded separately from said body and is attached to said end of said body with a connector member, said connector member is arranged between said body and said ear.

5. The visor of claim 1 wherein said body having a retention channel arranged in one side thereof.

6. The visor of claim 5 wherein said body having a retention channel arranged in another side thereof.

7. The visor of claim 5 wherein said channel having a generally L-shape when viewed from a side.

8. The visor of claim 1 wherein said body having a predetermined shaped cavity arranged in one side thereof, said body having a generally rectangular shape.

9. The visor of claim 8 wherein said cavity having at least one orifice therein, said cavity receives a vanity mirror therein.

10. The visor of claim 1 wherein said clamshell is made of a plastic material.

11. The visor of claim 1 wherein said first and second shell are molded having a connected longitudinal peripheral edge to form a hinge therebetween.

12. The visor of claim 1 wherein said clamshell generally having a L-shape when viewed from a side.

13. The visor of claim 1 wherein said support member having locking members extending therefrom, said support member will secure and hold a vanity mirror in the visor.

14. The visor of claim 1 further comprising a slider attached to said pivot rod and a support arm slidably engaging said slider.

15. The visor of claim 14 wherein each of said shells having a channel arranged therein for receiving said slider.

16. The visor of claim 5 wherein said clamshell having a retention rib extending therefrom.

17. The visor of claim 16 wherein said retention rib is arranged in said retention channel to secure said body to said clamshell.

18. The visor of claim 1 wherein said mirror support member having an orifice arranged through a surface thereof.

19. The visor of claim 4 wherein said connector member having a plurality of pins extending from each side thereof, said pins having a plurality of fingers extending from a surface thereof, said pins on one said side of said connector member interact with orifices in said ear and said pins on another said side of said connector member interact with orifices in said body to bendably secure said ear to said body.

20. The visor of claim 1 wherein said clamshell having a plurality of teeth extending from an inside surface of an edge of said clamshell.

21. The visor of claim 20 wherein said cover material generally having a sock like shape, said open end of said cover is tucked within said clamshell and secured over the visor by said teeth.

22. The visor of claim 1 wherein said shells having a plurality of complimentary structures to secure the shells to another, said structures comprising fasteners and snap fit members.

23. The visor of claim 1 wherein said pivot rod is capable of rotating with respect to said clamshell and sliding in a longitudinal direction with respect to said clamshell.

24. The visor of claim 1 further comprising a D-ring connected to said clamshell.

25. The visor of claim 1 wherein said body may be formed into any known shape with a predetermined hardness.

26. The visor of claim 1 wherein said cover material having a generally sock-like shape, said cover material having a sew line arranged along an open end of said sock and then said open end is tucked between said first and said second shell.

27. A hybrid visor for use in a vehicle, said visor comprising;
- a foam like body having a retention channel molded in a surface thereof;
- a hybrid clamshell having a generally L-shape, said clamshell having a retention rib extending from an inner peripheral edge thereof, said retention rib is arranged within said retention channel to secure said body to said clamshell, said clamshell having a connecting member arranged near an outer edge of a transverse length of said clamshell, said connecting member having a locking channel and a locking rib, said locking channel having a plurality of orifices through surfaces thereof, said locking rib mates and interacts with said locking channel and said plurality of orifices, said clamshell having a first and second shell, said first shell having a mirror support member extending from a bottom edge thereof, said mirror support member extends beyond a bottom edge of said second shell;
- a pivot rod arranged within said hybrid clamshell;
- a D-ring connected to said hybrid clamshell; and
- a cover material arranged over said body and said hybrid clamshell.

28. The visor of claim 27 further comprising a slider attached to said pivot rod.

29. The visor of claim 28 further comprising a support arm slidably engaging said slider.

30. The visor of claim 27 wherein said clamshell comprising a first and second shell.

31. The visor of claim 28 wherein said clamshell having a channel molded therein for receiving said slider.

32. The visor of claim 27 further comprising an ear extending from an end of said body.

33. The visor of claim 32 wherein said ear is molded with said body or said ear is bendably attached to an edge of said body by a living hinge.

34. The visor of claim 27 wherein said cover material having a sock-like shape, said cover material has an open end folded and secured in one end of said clamshell.

35. The visor of claim 27 further comprising a vanity mirror assembly connected to said mirror support member.

36. The visor of claim 27 wherein said body is made of an expanded polypropylene material, said body having a generally rectangular shape.

37. A method of assembling a hybrid visor for use in a vehicle, said method comprising the steps of:
- positioning a visor pivot rod between a first and second shell of a generally L-shaped hybrid clamshell, said first shell having a mirror support member extending from a bottom edge thereof, said mirror support member extends beyond a bottom edge of said second shell;
- positioning a body along an inner periphery of said hybrid clamshell;
- securing said first shell to said second shell, thereby holding said body between said shells along a generally L-shaped path; and
- positioning and securing a cover material over said hybrid clamshell and said body.

38. The method of claim 37 wherein said body is an expanded polypropylene material.

39. The method of claim 37 wherein said securing step uses fasteners or snap fit members to secure said shells to one another.

40. The method of claim 37 wherein said cover material having a generally sock like shape.

41. The method of claim 40 wherein an open end of said sock like shape is folded and held between outside edges of a short length portion of said hybrid clamshell.

42. The method of claim 37 wherein said hybrid clamshell having a mirror support member extending therefrom.

43. The method of claim 37 further comprising the step of positioning a slider between said first and said second shell.

44. The method of claim 37 further comprising a support arm between said first and said second shell.

45. The method of claim 37 further comprising the steps of connecting a D-ring to said hybrid clamshell.

46. A method of manufacturing a visor for a vehicle, said method comprising the steps of:
- molding first and second hybrid visor shells, said visor shells generally having a L-shape, said visor shells having a retention rib arranged thereon, said retention rib generally follows a L-shaped path, said first shell having a mirror support member extending from a bottom edge thereof, said mirror support member extends beyond a bottom edge of said second shell;
- molding a visor body from a foam material, said visor body having a retention channel molded therein, said retention channel generally follows an L-shaped path;
- positioning a visor pivot rod between said first and second shells;
- positioning said visor body between said first and second shells whereby each retention rib is arranged within said retention channel;
- closing said visor shells such that they capture and hold said visor body and said visor pivot rod; and
- covering said shells and said visor body with a predetermined shaped material.

47. The method of claim 46 wherein said visor body is molded from an expanded polypropylene material.

48. The method of claim 46 wherein said shells are molded from a plastic material.

49. The method of claim 46 wherein said material having a sock like shape.

50. The method of claim 49 wherein said step of covering further comprises tucking an open end of said material between edges of said shells.

51. The method of claim 46 wherein one of said shells having a mirror support member extending therefrom.

52. The method of claim 46 further comprising the step of positioning a slider between said shells.

53. The method of claim 46 further comprising the step of positioning a support arm between said shells.

54. The method of claim 46 further comprising the step of connecting a D-ring to said hybrid visor shells.

55. The method of claim 51 further comprising the step of connecting a vanity mirror assembly to said mirror support member.

* * * * *